US009727725B2

(12) United States Patent
Wagner et al.

(10) Patent No.: US 9,727,725 B2
(45) Date of Patent: Aug. 8, 2017

(54) SECURITY PROTOCOLS FOR LOW LATENCY EXECUTION OF PROGRAM CODE

(71) Applicant: Amazon Technologies, Inc., Seattle, WA (US)

(72) Inventors: Timothy Allen Wagner, Seattle, WA (US); Dylan Chandler Thomas, Seattle, WA (US); Ajay Nair, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/613,723

(22) Filed: Feb. 4, 2015

(65) Prior Publication Data
US 2016/0224785 A1 Aug. 4, 2016

(51) Int. Cl.
*G06F 9/455* (2006.01)
*G06F 21/53* (2013.01)
(Continued)

(52) U.S. Cl.
CPC .......... *G06F 21/53* (2013.01); *G06F 9/45533* (2013.01); *G06F 21/44* (2013.01); *G06F 21/552* (2013.01)

(58) Field of Classification Search
None
See application file for complete search history.

(56) References Cited

U.S. PATENT DOCUMENTS 5,283,888 A 2/1994 Dao et al.
5,970,488 A 10/1999 Crowe et al.
(Continued)

FOREIGN PATENT DOCUMENTS

EP 2663052 A1 11/2013
WO WO 2009/137567 A1 11/2009
(Continued)

OTHER PUBLICATIONS

Adapter pattern—Wikipedia, the free encyclopedia, Apr. 4, 2015, XP055275559, Retrieved from the Internet: URL:https://en.wikipedia.org/w/index.php?title=Adapter_pattern&oldid=654971255 [retrieved on May 26, 2016] the whole document.

(Continued)

*Primary Examiner* — Dong Kim
(74) *Attorney, Agent, or Firm* — Knobbe, Martens, Olson & Bear, LLP

(57) ABSTRACT

A system for providing security mechanisms for secure execution of program code is described. The system may be configured to maintain a plurality of virtual machine instances. The system may be further configured to receive a request to execute a program code and allocate computing resources for executing the program code on one of the virtual machine instances. One mechanism involves executing program code according to a user-specified security policy. Another mechanism involves executing program code that may be configured to communicate or interface with an auxiliary service. Another mechanism involves splitting and executing program code in a plurality of portions, where some portions of the program code are executed in association with a first level of trust and some portions of the program code are executed with different levels of trust.

23 Claims, 7 Drawing Sheets

(51) Int. Cl.
  *G06F 21/44* (2013.01)
  *G06F 21/55* (2013.01)

(56) References Cited

U.S. PATENT DOCUMENTS

| | | |
|---|---|---|
| 6,708,276 B1 | 3/2004 | Yarsa et al. |
| 7,036,121 B1 | 4/2006 | Casabona et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,266 B2 | 11/2011 | DeVal et al. |
| 8,065,676 B1 | 11/2011 | Sahai et al. |
| 8,095,931 B1 | 1/2012 | Chen et al. |
| 8,146,073 B2 | 3/2012 | Sinha |
| 8,166,304 B2 | 4/2012 | Murase et al. |
| 8,171,473 B2 | 5/2012 | Lavin |
| 8,336,079 B2 | 12/2012 | Budko et al. |
| 8,429,282 B1 | 4/2013 | Ahuja |
| 8,448,165 B1 | 5/2013 | Conover |
| 8,631,130 B2 | 1/2014 | Jackson |
| 8,719,415 B1 | 5/2014 | Sirota et al. |
| 8,725,702 B1 | 5/2014 | Raman et al. |
| 8,756,696 B1 | 6/2014 | Miller |
| 8,825,964 B1 | 9/2014 | Sopka et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 7/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 2002/0172273 A1 | 11/2002 | Baker et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2008/0028409 A1 | 1/2008 | Cherkasova et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0269109 A1 | 10/2010 | Cartales |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0134761 A1 | 6/2011 | Smith |
| 2011/0141124 A1 | 6/2011 | Halls et al. |
| 2011/0153838 A1 | 6/2011 | Belkine et al. |
| 2011/0154353 A1 | 6/2011 | Theroux et al. |
| 2011/0184993 A1 | 7/2011 | Chawla et al. |
| 2011/0265164 A1 | 10/2011 | Lucovsky |
| 2011/0314465 A1 | 12/2011 | Smith et al. |
| 2012/0072914 A1 | 3/2012 | Ota |
| 2012/0096468 A1 | 4/2012 | Chakravorty et al. |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0205092 A1 | 8/2013 | Roy et al. |
| 2013/0219390 A1 | 8/2013 | Lee et al. |
| 2013/0227641 A1 | 8/2013 | White et al. |
| 2013/0232480 A1 | 9/2013 | Winterfeldt et al. |
| 2013/0263117 A1 | 10/2013 | Konik et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346987 A1 | 12/2013 | Raney et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |

(56) References Cited

U.S. PATENT DOCUMENTS

| | | |
|---|---|---|
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0380085 A1 | 12/2014 | Rash et al. |
| 2015/0074659 A1 | 3/2015 | Madsen et al. |
| 2015/0120928 A1 | 4/2015 | Gummaraju et al. |
| 2015/0235144 A1 | 8/2015 | Gusev et al. |
| 2015/0261578 A1 | 9/2015 | Greden et al. |
| 2015/0350701 A1 | 12/2015 | Lemus et al. |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0164797 A1 | 6/2016 | Reque et al. |
| 2016/0224360 A1 | 8/2016 | Wagner et al. |
| 2016/0239318 A1 | 8/2016 | Wagner |
| 2016/0299790 A1 | 10/2016 | Thompson |
| 2016/0301739 A1 | 10/2016 | Thompson |

FOREIGN PATENT DOCUMENTS

| | | |
|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 | 6/2016 |
| WO | WO 2016/126731 | 8/2016 |
| WO | WO 2016/164633 | 10/2016 |
| WO | WO 2016/164638 | 10/2016 |

OTHER PUBLICATIONS

Czajkowski et al., Multitasking without compromise: a virtual machine evolution, Apr. 2012, 14 pages.

Dombrowski et al., Dynamic monitor allocation in the Java virtual machine, Oct. 2013, 8 pages.

Espadas, J., et al., A Tenant-Based Resource Allocation Model for Scaling Software-as-a-Service Applications Over Cloud Computing Infrastructures, Future Generation Computer Systems 29.1, pp. 273-286, 2013.

Qian et al., Estimating optimal cost of allocating virtualized resources with dynamic demand, Sep. 2011, 2 pages.

Shim (computing)—Wikipedia, the free encyclopedia, Apr. 4, 2015, XP055275558 [retrieved on May 26, 2016].

Vaquero et al. "Dynamically scaling applications in the cloud," ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.

International Search Report and Written Opinion in PCT/US2015/052810 dated Dec. 17, 2015, 18 pages.

International Search Report and Written Opinion in PCT/US2015/052838 dated Dec. 18, 2015, 23 pages.

International Search Report and Written Opinion in PCT/US2015/052833 dated Jan. 13, 2016, 17 pages.

International Search Report and Written Opinion in PCT/US2015/064071 dated Mar. 16, 2016, 17 pages.

International Search Report and Written Opinion in PCT/US2016/016211 dated Apr. 13, 2016 11 pages.

International Search Report and Written Opinion in PCT/US2016/026514 dated Jun. 8, 2016, 20 pages.

International Search Report and Written Opinion in PCT/US2016/026520 dated Jul. 5, 2016.

Nakajima et al., Optimizing Virtual Machines Using Hybrid Virtualization, SAC '11, Mar. 21-25, 2011, TaiChung, Taiwan, pp. 573-578.

Vaghani, Virtual Machine File System, ACM SIGOPS Operating Systems Review 44(4):57-70, Dec. 2010.

Zheng et al., Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2016/054774 dated Dec. 16, 2016.

SECURITY PROTOCOLS FOR LOW LATENCY EXECUTION OF PROGRAM CODE

CROSS-REFERENCE TO OTHER APPLICATIONS

The present application's Applicant is concurrently filing the following U.S. patent applications on Feb. 4, 2015:

| | Title |
|---|---|
| 14/613,688 | SECURITY PROTOCOLS FOR LOW LATENCY EXECUTION OF PROGRAM CODE |
| 14/613,735 | SECURITY PROTOCOLS FOR LOW LATENCY EXECUTION OF PROGRAM CODE |

The present application's Applicant previously filed the following U.S. patent applications on Sep. 30, 2014:

| application Ser. No. | Title |
|---|---|
| 14/502,589 | MESSAGE-BASED COMPUTATION REQUEST SCHEDULING |
| 14/502,810 | LOW LATENCY COMPUTATIONAL CAPACITY PROVISIONING |
| 14/502,714 | AUTOMATIC MANAGEMENT OF LOW LATENCY COMPUTATIONAL CAPACITY |
| 14/502,992 | THREADING AS A SERVICE |
| 14/502,648 | PROGRAMMATIC EVENT DETECTION AND MESSAGE GENERATION FOR REQUESTS TO EXECUTE PROGRAM CODE |
| 14/502,741 | PROCESSING EVENT MESSAGES FOR USER REQUESTS TO EXECUTE PROGRAM CODE |
| 14/502,620 | DYNAMIC CODE DEPLOYMENT AND VERSIONING |

The disclosures of the above-referenced applications are hereby incorporated by reference in their entireties.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
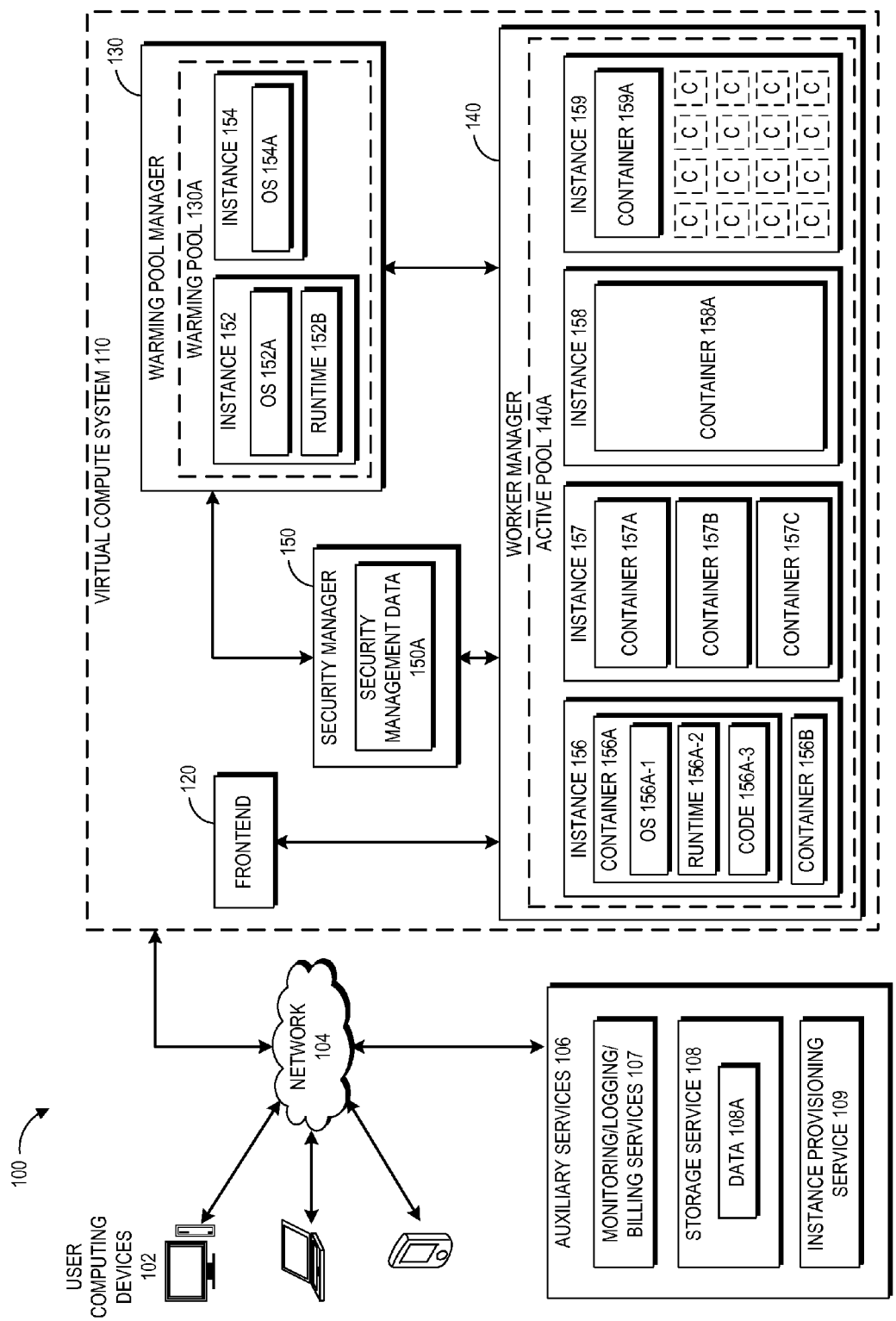
FIG. 1 is a block diagram depicting an illustrative environment for providing low latency compute capacity, according to an example aspect.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices and may contain their own operating systems and other applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased (e.g., in the form of virtual machine instances), developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Thus, an improved method of allowing users to take advantage of the virtual machine instances provided by service providers is desired.

According to aspects of the present disclosure, by maintaining a pool of pre-initialized virtual machine instances that are ready for use as soon as a user request is received, delay (sometimes referred to as latency) associated with executing the user code (e.g., instance and language runtime startup time) can be significantly reduced.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. Maintaining the pool of virtual machine instances may involve creating a new instance, acquiring a new instance from an external instance provisioning service, destroying an instance, assigning/reassigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In another aspect, a virtual compute system may monitor and log information related to the amount of resources allocated for executing user code. By doing so, the virtual compute system may be able to identify opportunities for improving the performance of the user code execution by adjusting the amount of allocated resources. Error rates may be reduced by increasing the amount of allocated resources in the event of over-utilization, and costs associated with executing the user code may be reduced by decreasing the amount of allocated resources in the event of under-utilization.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programing interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, a worker manager 140, and a security manager 150. In the depicted example, virtual machine instances ("instances") 152, 154 are shown in a warming pool 130A managed by the warming pool manager 130, and instances 156, 157, 158, 159 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 157, 158, 159 can be implemented on one or more physical computing devices in different various geographic regions. Similarly, each of the frontend 120, the warming pool manager 130, the worker manager 140, and the security manager 150 can be implemented across multiple physical computing devices. Alternatively, one or more of the frontend 120, the warming pool manager 130, the worker manager 140, and the security manager 150 can be implemented on a single physical computing device. In some embodiments, the virtual compute system 110 may comprise multiple frontends, multiple warming pool managers, multiple worker managers, and/or multiple capacity managers. Although six virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, CPU, storage, network packets, etc.) to be reserved for executing the program code. For example, the program code may be provided with the request, previously uploaded by the user, provided by the virtual compute system 110 (e.g., standard routines), and/or provided by third parties. In some embodiments, resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the resource-level constraints are adjusted over time and may vary across different executions of a single program code. For example, the same program code may be used to process two different sets of data, where one set of data requires more resources than the other. In such a case, the user may specify different resource constraints for the two different executions or the virtual compute system 110 may automatically adjust the amount of resources allocated to each execution of the program code based on spatial (e.g., in other parts of the virtual compute system 110) or historical (e.g., over time) trends for the user and/or program code. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); and etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In the example illustrated in FIG. 1, user codes are executed in isolated compute systems referred to as containers. Containers are logical units created within a virtual machine instance using the resources available on that instance. For example, the worker manager 140 may, based on information specified in the request to execute user code, create a new container or locate an existing container in one of the instances in the active pool 140A and assign the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance).

As shown in FIG. 1, instances may have operating systems (OS), language runtimes, and containers. The containers may have individual copies of the OS and the language runtimes and user codes loaded thereon. In the example of FIG. 1, the active pool 140A managed by the worker manager 140 includes the instances 156, 157, 158, 159. The instance 156 has containers 156A, 156B. The container 156A has OS 156A-1, runtime 156A-2, and code 156A-3 loaded therein. In the depicted example, the container 156A has its own OS, runtime, and code loaded therein. In one embodiment, the OS 156A-1 (e.g., the kernel thereof), runtime 156A-2, and/or code 156A-3 are shared among the containers 156A, 156B (and any other containers not illustrated in FIG. 1). In another embodiment, the OS 156A-1 (e.g., any code running outside the kernel), runtime 156A-2, and/or code 156A-3 are independent copies that are created for the container 156A and are not shared with other containers on the instance 156. In yet another embodiment, some portions of the OS 156A-1, runtime 156A-2, and/or code 156A-3 are shared among the containers on the instance 156, and other portions thereof are independent copies that are specific to the container 156A. The instance 157 includes containers 157A, 157B, 157C, the instance 158 includes a container 158A, and the instance 159 includes a container 159A.

In the example of FIG. 1, the sizes of the containers depicted in FIG. 1 may be proportional to the actual size of the containers. For example, the container 156A occupies more space than the container 156B on the instance 156. Similarly, the containers 157A, 157B, 157C, 159A may be equally sized, and the container 158A may be larger (e.g., have more computing resources allocated thereto) than the containers 157A, 157B, 157C, 159A. The dotted boxes labeled "C" shown in the instance 159 indicate the space remaining on the instances that may be used to create new instances. In some embodiments, the sizes of the containers may be 64 MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance. For example, five containers having a memory size of 1 GB (5 GB in total) may be created in an instance having a memory size of 4 GB. If each of the containers does not reach the full capacity of 1 GB, the containers may function properly despite the over-subscription.

Although the components inside the containers 156B, 157A, 157B, 157C, 158A, 159A are not illustrated in the example of FIG. 1, each of these containers may have various operating systems, language runtimes, libraries, and/or user code. In some embodiments, instances may have user codes loaded thereon (e.g., in an instance-level cache), and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

After a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156A-3 shown in the container 156A), the worker manager 140 may assign the container to the request and cause the user code to be executed in the container. Alternatively, if the user code is available in the local cache of one of the virtual machine instances (e.g., stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110 ) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manager 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. In some embodiments, the virtual compute system 110 may maintain a separate cache in which user codes are stored to serve as an intermediate level of caching system between the local cache of the virtual machine instances and a web-based network storage (e.g., accessible via the network 104).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110 ) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services. The monitoring/logging/billing services 107 may communicate with the security manager 150 to allow the security manager 150 to determine the appropriate security mechanisms and policies to be used for executing the various program codes on the virtual compute system 110.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The security manager 150 manages the security of program code executed for incoming requests to execute user code on the virtual compute system 110. For example, the security manager 150 may communicate with the frontend 120, the warming pool manager 130, the worker manager 140, and/or the auxiliary services 106 to configure, monitor, and manage the security settings used for various program codes executed on the virtual compute system 110. Although the security manager 150 is illustrated as a distinct component within the virtual compute system 110, part or all of the functionalities of the security manager 150 may be performed by the frontend 120, the warming pool manager 130, the worker manager 140, and/or the auxiliary services 106. For example, the security manager 150 may be implemented entirely within one of the other components of the virtual compute system 110 or in a distributed manner across the other components of the virtual compute system 110. In the example of FIG. 1, the security manager 150 includes security management data 150A. The security management data 150A may include data including any security policies specified by the users or determined by the security manager 150 for managing the security of program code on the virtual compute system 110, which are described below in greater detail.

As discussed above, the request itself may specify the security policy, including security settings and parameters to be used for executing the program code associated with the request. For example, certain users of the virtual compute system 110 may be trusted and thus the virtual compute system 110 may provide the capability for such users to customize security settings associated with functions in their program code to enable the flexibility offered by executing the program code under less strict security requirements. The request may also specify configuration data usable to enable the program code to communicate with an auxiliary service during execution by the virtual compute system 110. For example, certain users of the virtual compute system 110 may wish to execute certain program code on the virtual compute system 110 that still has the ability to communicate with the user's virtual private cloud or other network-based service in a secured manner. The request may also specify one or more trusted credentials to be used in association with the program code or a portion thereof. For example, certain program code may include "trusted" portions which require the use of a trusted credential (e.g., a secured login associated with the user) during execution, which may present a possible increased security risk if such trusted portions were to be compromised. Program code may also include other portions involving a different level of trust which may not require the use of a trusted credential (e.g., the code may involve a standard file conversion process which may not require any particular credential to be invoked). Thus, it may be possible to split program code into a first portion having a first level of trust and a second portion having a second level of trust using multiple containers with varying levels of security associated with each. After such a request has been processed and a virtual machine instance has been assigned to the user associated with the request, the security manager 150 may configure the virtual machine instance according to the security policy, configuration data, and/or trusted credential information to enable the program code to be executed on the virtual machine instance in a secure or trusted manner. In some embodiments the trusted credential may be managed and/or maintained by the virtual compute system 110 or one of its subsystems, while in other embodiments the trusted credential may be managed and/or maintained by a first or third party credential management system and provided to the virtual compute system 110 on a case by case basis.

In some embodiments, the security manager 150 may, instead of creating a new container and allocating the specified amount of resources to the container, locate an existing container having the specified security settings and cause the program code to be executed in the existing container.

After a container has been created or located, the program code associated with the request is executed in the container. The amount of resources allocated to the container (e.g., requested by the user) and/or the amount of resources actually utilized by the program code may be logged (e.g., by the monitoring/logging/billing services 107 and/or the security manager 150) for further analysis. For example, the logged information may include the amount of memory, the amount of CPU cycles, the amount of network packets, and the amount of storage actually used by the program during one or more executions of the program code in the container. Additionally, the logged information may include any security-related activity performed during execution of the program code (e.g., inbound or outbound network connections made, auxiliary services contacted, trusted credentials which were utilized, etc.), resource utilization, error rates, latency, and any errors or exceptions encountered during the execution of the program code. In some embodiments, any security data which appears suspect (e.g., unauthorized network connections made, unauthorized interaction with an auxiliary service, potential compromise of a trusted credential, and the like) are tagged with a special marking and further analyzed by the security manager 150.

In some embodiments, the security manager 150 may create, or have access to, multiple classes of users, and apply different rules for different classes of users. For example, for more sophisticated users, more control may be given (e.g., control over individual security parameters), whereas for other users, they may be allowed to control only a single representative parameter, and other parameters may be adjusted based on the representative parameter.

In some embodiments, the security manager 150 may, based on the information logged by the monitoring/logging/billing services 107 and/or the security manager 150, provide some guidance to the user as to what the user may do to improve the security of the program code or to reduce risks associated with executing the program code on the virtual compute system 110. For example, the security manager 150 may provide to the user, after seeing repeated occurrences of potential or apparent security breaches, an indication that the user appears to be consistently setting a security parameter too high for running a particular user code. For example, the security parameter may contribute to a higher security risk based on a number of factors. In general, the indication may suggest different settings, configurations, or categorizations for various security parameters. In some embodiments, such an indication is provided to the user after a threshold number of security issues, errors, exceptions, or other telling conditions (e.g., increased latency, unauthorized accesses, etc.) have been processed by the security manager 150. The security manager 150 may provide the indication via any notification mechanism including email, Simple Notification Service ("SNS"), Short Message Service ("SMS"), etc.

In some embodiments, the security manager 150 may utilize code-specific characteristics to improve the security parameters for executing individual program codes. For example, program codes handling image processing might not require a trusted credential, whereas program codes handling databases might require a trusted credential in order to grant permission to access or update the databases. Such code-specific characteristics may be maintained by the security manager 150 and the security policies of individual program codes may be adjusted accordingly.

The security mechanisms described herein may be used in any combination. For example, in one embodiment, a user may specify configuration data for a program code to communicate with an auxiliary service. Such communication may involve the use of a trusted credential (e.g., to login to an account at the auxiliary service associated with the user). Thus, the user may further wish to have the program code executed by two or more containers (e.g., at least one container with a first level of trust, which executes any program code involving communication with the auxiliary service using the trusted credential and another container with a second level of trust which executes other program code without involving communication with the auxiliary service). In another embodiment, the user may provide a security policy in association with program code which also involves communication with an auxiliary service. The user may wish to specify security parameters associated with how the program code executes and interacts with the auxiliary service. In another embodiment, the user may provide a security policy in association with program code which also involves execution of the program code using a multiplicity of containers (e.g., containers having different levels of trust). Thus, the user may want to enable multiple containers to communicate with each other during execution and specify how via the security policy and parameters.

Figure 2:
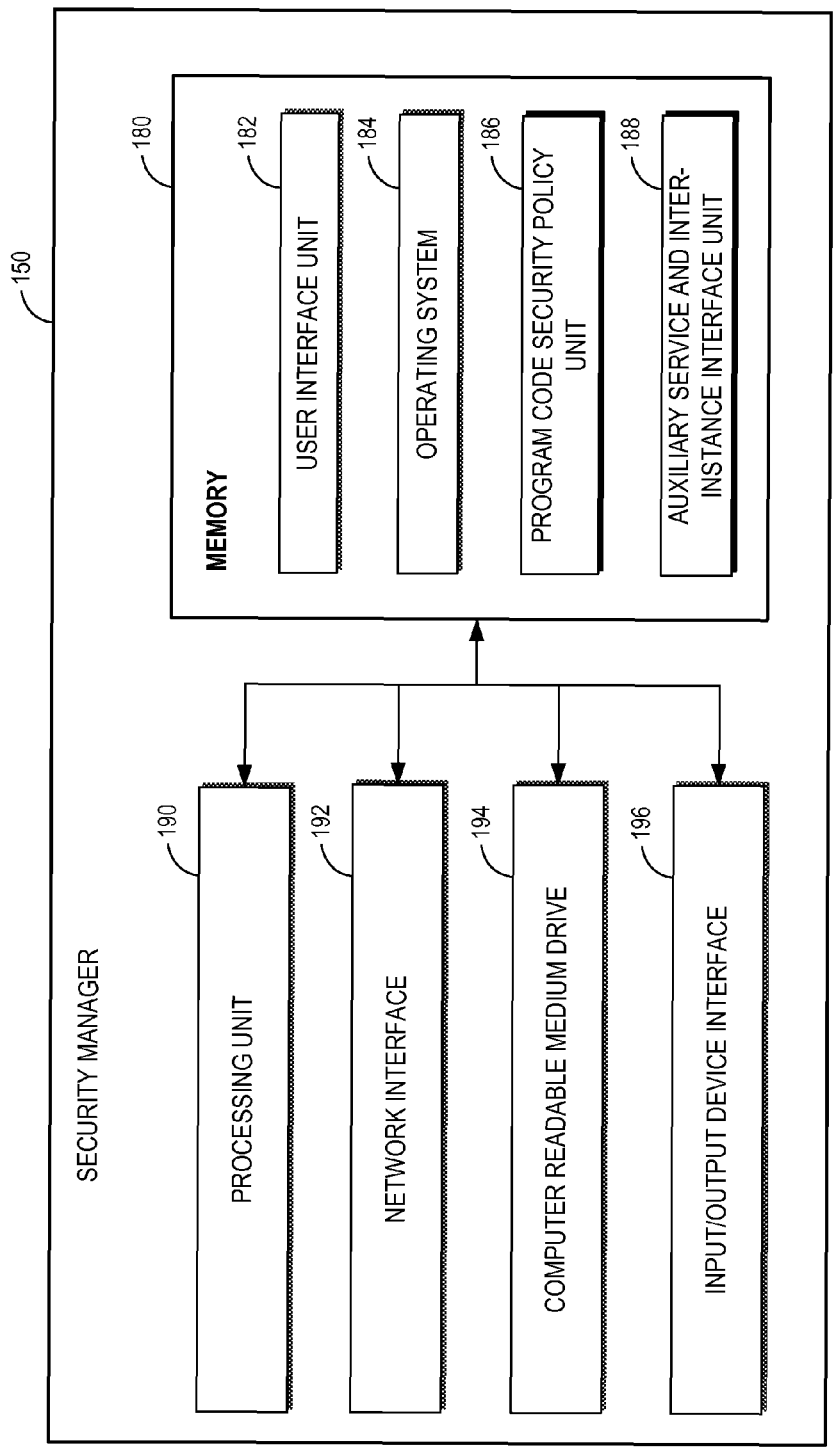
FIG. 2 depicts a general architecture of a computing device providing a security manager for managing security in an environment for providing low latency compute capacity, as implemented by a virtual compute system, such as the virtual compute system of FIG. 1.

FIG. 2 depicts a general architecture of a computing system (referenced as security manager 150) that manages the virtual machine instances in the virtual compute system 110. The general architecture of the security manager 150 depicted in FIG. 2 includes an arrangement of computer hardware and software modules that may be used to implement aspects of the present disclosure. The security manager 150 may include many more (or fewer) elements than those shown in FIG. 2. It is not necessary, however, that all of these generally conventional elements be shown in order to provide an enabling disclosure. As illustrated, the security manager 150 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the security manager 150. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a program code security policy unit 186 and an auxiliary service and inter-instance interface unit 188 that may be executed by the processing unit 190. In one embodiment, the user interface unit 182, program code security policy unit 186, and auxiliary service and inter-instance interface unit 188 individually or collectively implement various aspects of the present disclosure, e.g., monitoring and logging the execution of program codes on the virtual compute system 110, determining the need for adjusting the security settings for particular instances, containers, and/or requests, etc. as described further below.

The program code security policy unit 186 monitors execution of user code on the virtual compute system 110 and provides containers according to security policies and security mechanisms for executing the user code. As described herein, security policies may be user-specified and provided at the time a request is received by the virtual compute system 110, or at a time prior to execution of the program code such as when the user registers the program code for execution by the virtual compute system 110. Security policy information may be stored at the security management data 150A, for example to facilitate faster access and processing of requests which require a particular security policy to be applied. The security policy information may also be stored with the program code, such as the storage service 108, and accessed at the time the program code is accessed to be loaded onto a container.

The auxiliary service and inter-instance interface unit 188 provide and manage capabilities related to securely allowing containers to interact with one or more auxiliary services (e.g., via virtual private cloud ("VPC:") tunneling or similar network communication) or with each other (e.g., via inter-process communication ("IPC") tunneling or similar network communication). Such communications may need to be closely monitored and activity logged in order to identify suspicious network activity that may indicate a security breach. If suspicious activity for a container is identified the auxiliary service and inter-instance interface unit 188 may send a message to the worker manager 140 to shut the container down to minimize any further security breach activity. The auxiliary service and inter-instance interface unit 188 may also send a notification to the user that a particular program code may have been involved in suspicious activity and suggest that the user may need to change the security policy, configuration data, and/or trusted credentials associated with the program code to avoid further security breaches. In some instances the auxiliary service and inter-instance interface unit 188 may, after repeated security breaches (actual or suspected), prevent the program code from being loaded and executed on a container until the user has addressed the issue.

While the program code security policy unit 186 and the auxiliary service and inter-instance interface unit 188 are shown in FIG. 2 as part of the security manager 150, in other embodiments, all or a portion of the program code security policy unit 186 and the auxiliary service and inter-instance interface unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the security manager 150.

Figure 3:
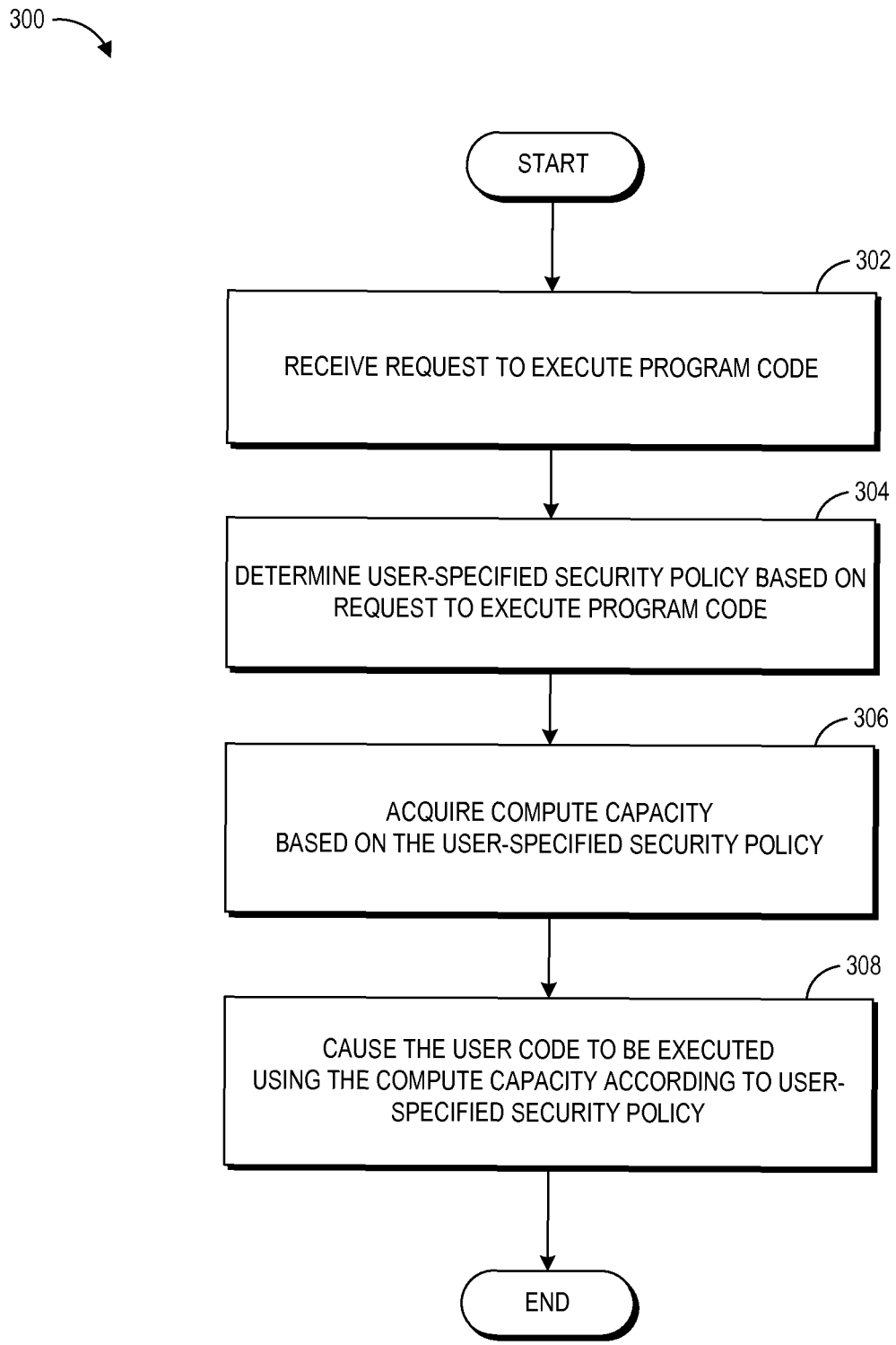
FIG. 3 is a flow diagram illustrating a security routine which involves a user-specified security policy, as implemented by a virtual compute system, such as the virtual compute system of FIG. 1.

Turning now to FIG. 3, a routine 300 implemented by one or more components of the virtual compute system 110 (e.g., the security manager 150) will be described. Although routine 300 is described with regard to implementation by the security manager 150, one skilled in the relevant art will appreciate that alternative components may implement routine 300 or that one or more of the blocks may be implemented by a different component or in a distributed manner.

At block 302 of the illustrative routine 300, the security manager 150 receives a request to execute program code. Alternatively, the security manager 150 receives a request from the worker manager 140 of FIG. 1 to determine appropriate security settings for executing the program code associated with an incoming request received and processed by the frontend 120. For example, the frontend 120 may process the request received from the user computing devices 102 or the auxiliary services 106, and forward the request to the worker manager 140 after authenticating the user and determining that the user is authorized to access the specified user code. The worker manager 140 may then forward the request to the security manager 150. As discussed above, the request may include data or metadata that indicates the program code to be executed, the language in which the program code is written, the user associated with the request, and/or the computing resources (e.g., memory, etc.) to be reserved for executing the program code. The request may also include data or metadata that indicates a user-specified security policy. The user-specified security policy may indicate one or more security parameters by which the program code is to be executed. For example, the security parameters may include one or more of: a processing duration limit, a CPU utilization limit, a disk space or other memory limit, a parameter to enable a transmission control protocol ("TCP") socket connection, a parameter to enable an inbound or an outbound network connection to the container, a parameter to enable the container to communicate with an auxiliary service (such as a virtual private cloud), a parameter to enable the container to communicate with a second container contained on the selected virtual machine instance, a parameter to enable the container to communicate with a second container contained on a second virtual machine instance, and a list of access-restricted functions which the container is permitted to execute in association with the program code.

Next, at block 304, the security manager 150 determines a user-specified security policy based on the request to execute program code. For example, the security manager 150 may receive the security policy with the request as described above. In another scenario, the security manager 150 may access the security policy, for example from the security management data 150A or loaded from the storage service 108. The security policy may relax or modify one or more restraints imposed by the security manager 150 in conjunction with execution of the program code. For example, the security policy may specify that program code loaded on and executed by a container may be allowed to establish inbound or outbound network connections in order to facilitate execution of other program code, such as program code on another container on the virtual machine instance containing the container, program code on another container on a different virtual machine instance, or program code on an auxiliary service. The security policy may further specify whether use of a native code library and other code is allowed in conjunction with execution of the program code.

At block 306, the worker manager 140 acquires compute capacity based on the information indicated in the request, based at least in part on the user-specified security policy. For example, the security policy may specify a user-preferred duration for execution of the program code, and the compute capacity may be acquired for the duration. In another example, the security policy may specify that the program code is permitted to make outbound TCP socket connections, and the compute capacity may be acquired in order to allow outbound TCP socket connections. In some embodiments, the compute capacity comprises a container that is configured to service the code execution request. As discussed herein, the container may be acquired from the active pool 140A or the warming pool 130A. One way in which the compute capacity may be acquired is described in greater detail with respect to FIG. 4 of U.S. application Ser. No. 14/502,810, titled "LOW LATENCY COMPUTATIONAL CAPACITY PROVISIONING," filed on Sep. 30, 2014, which was previously incorporated by reference in its entirety above. The container may be acquired based on the security policy such that the worker manager 140 can determine whether a container in the active pool 140A or the warming pool 130A is available and configured with the same security policy associated with the program code to be executed for the request. If a similarly-configured container is available, or at least one which is configured in a way that agrees with the security policy, that container may be acquired to service the request.

At block 308, the security manager 150 or the worker manager 140 causes the user code to be executed using the compute capacity and according to the user-specified security policy. For example, the worker manager 140 may send the address of the container assigned to the request to the frontend 120 so that the frontend 120 can proxy the code execution request to the address. In some embodiments, the address may be temporarily reserved by the worker manager 140 and the address and/or the container may automatically be released after a specified time period elapses. In some embodiments, the address and/or the container may automatically be released after the user code has finished executing in the container.

While the routine 300 of FIG. 3 has been described above with reference to blocks 302-308, the embodiments described herein are not limited as such, and one or more blocks may be omitted, modified, or switched without departing from the spirit of the present disclosure.

Figure 4:
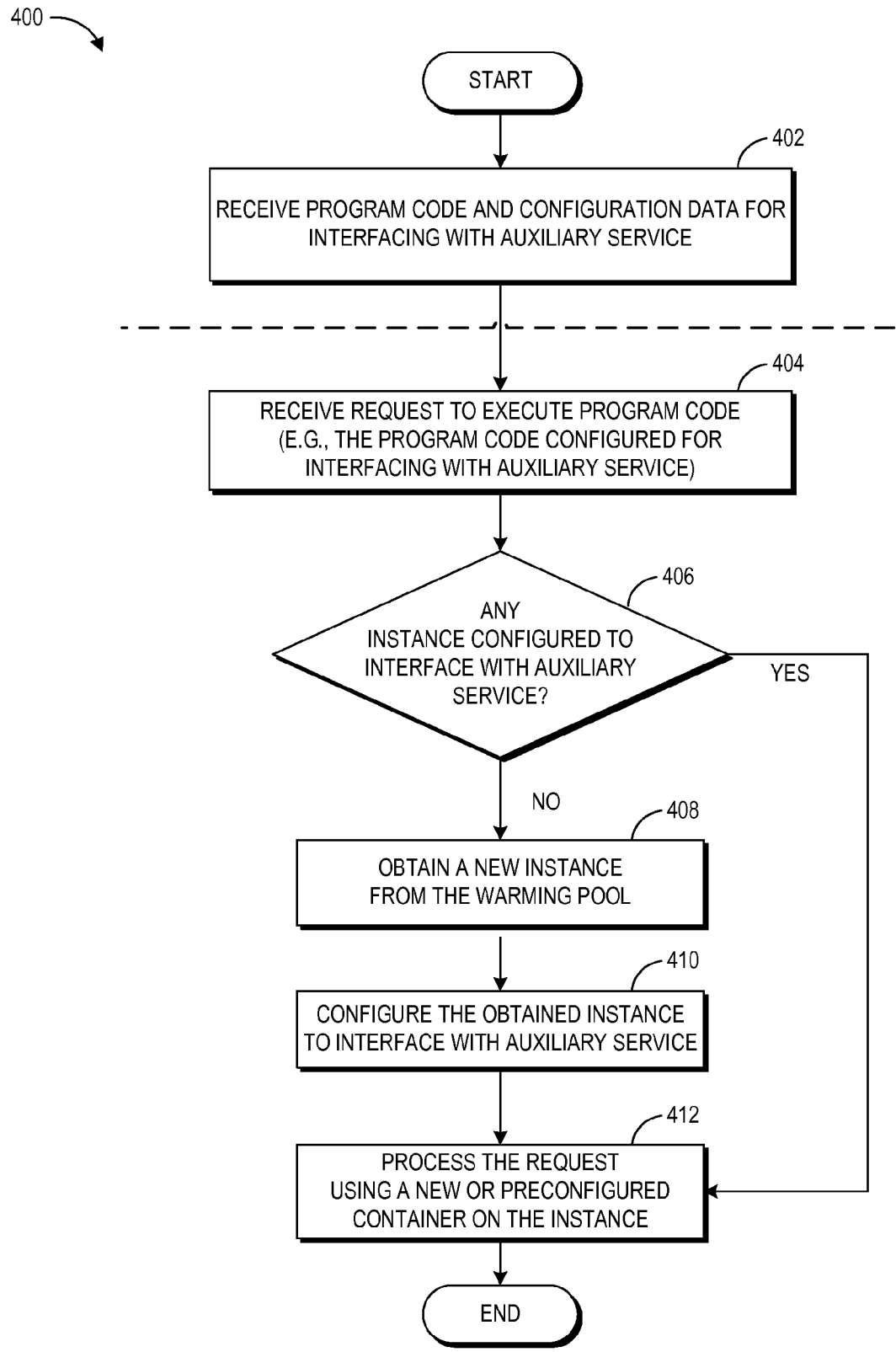
FIG. 4 is a flow diagram illustrating a security routine which involves interfacing with an auxiliary service, as implemented by a virtual compute system, such as the virtual compute system of FIG. 1.

Turning now to FIG. 4, a routine 400 implemented by one or more components of the virtual compute system 110 (e.g., the security manager 150) will be described. Although routine 400 is described with regard to implementation by the security manager 150, one skilled in the relevant art will appreciate that alternative components may implement routine 400 or that one or more of the blocks may be implemented by a different component or in a distributed manner.

At block 402 of the illustrative routine 400, the virtual compute system 110 receives program code and configuration data for interfacing with an auxiliary service. For example, the user, such as the developer of the program code, may provide associated configuration data that specifies how the program code may initiate a connection or otherwise communicate with the auxiliary service during execution of the program code. The configuration data may include, for example, a network address and a login credential associated with an account on the auxiliary service, wherein the account is associated with the user registering the program code with the virtual compute system. Thus, when the program code is executed by the virtual compute system the network address and login credential may be used to connect or "tunnel" to the auxiliary service. As an example, the user may wish to configure program code to tunnel to an auxiliary service, such as a virtual private cloud, to provide data such as a notification, log data, a status report, and so on. In another embodiment, the configuration data may include a credential and a file system mount point. The file system mount point may, for example, indicate or specify how to access a file system which stores a plurality of program codes accessed by the virtual compute system 110.

Next, at block 404, the worker manager 140 receives a request to execute program code, such as the program code previously received by the virtual compute system 110 as described at block 402. For example, the block 404 may be similar to the block 302 of FIG. 3. The request may include or specify configuration data to enable the program code to interface with the auxiliary service, or the worker manager 140 and/or the security manager 150 may determine that the program code is associated with configuration data (for example, by accessing the security management data 150A or data 108A to determine if there is any configuration data associated with the program code).

At block 406, the worker manager 150 determines whether there exists an instance in the active pool 130A that is currently assigned to the user associated with the request and has been configured to enable, support, or allow interfacing with the auxiliary service. For example, one of the instances may have previously executed the program code in a container created thereon, and the container may since have been terminated, but the program code may still remain on the instance (e.g., in an instance code cache). If the worker manager 140 determines that there is such an instance, the routine 400 proceeds to block 412, described below. On the other hand, if the worker manager 140 determines that there is no such instance, the routine 400 proceeds to block 408.

At block 408 the worker manager 140 obtains a new instance from the warming pool 130A or from the warming pool manager 130. At block 410, the worker manager 140 configures the obtained instance to interface with the auxiliary service.

Once the obtained instance has been configured at block 410 or acquired from the active pool 140A at block 406, the routine 400 proceeds to block 412 where the worker manager 140 causes the request to be processed using either a new or a preconfigured container. Before a new container is created, the worker manager 140 may determine whether the instance has resources sufficient to handle the request.

While the routine 400 of FIG. 4 has been described above with reference to blocks 402-412, the embodiments described herein are not limited as such, and one or more blocks may be omitted, modified, or switched without departing from the spirit of the present disclosure.

Figure 5:
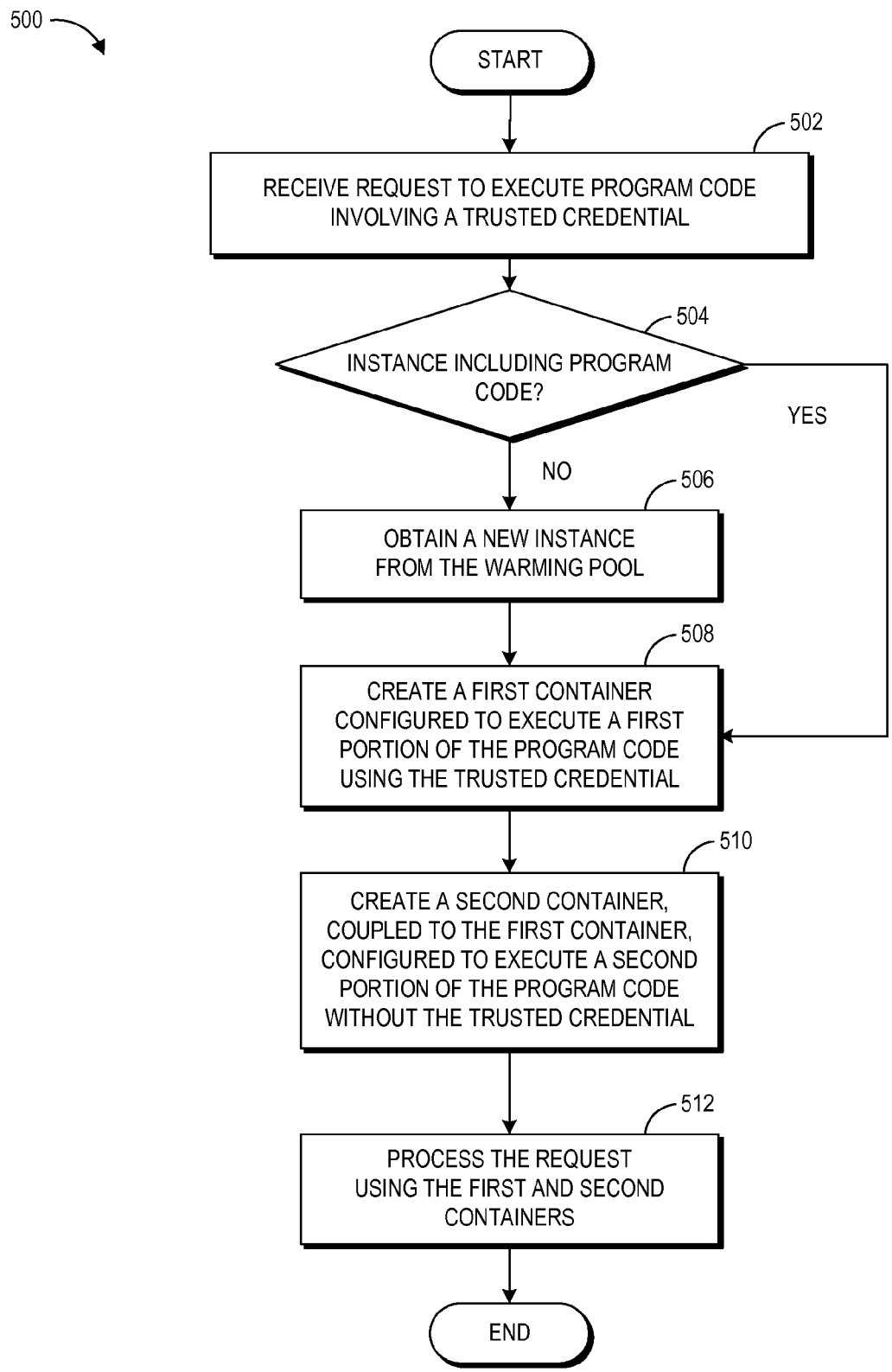
FIG. 5 is a flow diagram illustrating a security routine which involves executing program code in portions associated with different levels of trust, as implemented by a virtual compute system, such as the virtual compute system of FIG. 1.

Turning now to FIG. 5, a routine 500 implemented by one or more components of the virtual compute system 110 (e.g., the security manager 150) will be described. Although routine 500 is described with regard to implementation by the security manager 150, one skilled in the relevant art will appreciate that alternative components may implement routine 500 or that one or more of the blocks may be implemented by a different component or in a distributed manner.

At block 502 of the illustrative routine 500, the worker manager 140 receives a request to execute program code. For example, the block 502 may be similar to the block 302 of FIG. 3. The request may include or indicate a trusted credential to be used by at least some of the program code during execution. In one embodiment, the trusted credential may be previously registered by the user with the program code and accessed, for example from the security management data 150A or data 108, to determine whether the request to execute program code involves use of a trusted credential. Configuration data associated with the program code may also be accessed and used by the security manager 150 to determine whether and which portions of the program code are to be executed using the trusted credential.

At block 504, determines whether there exists an instance in the active pool 130A that is currently assigned to the user associated with the request and has been loaded with the program code. For example, one of the instances may have previously executed the program code in a container created thereon, and the container may since have been terminated, but the program code may still remain on the instance (e.g., in an instance code cache). If the worker manager 140 determines that there is such an instance, the routine 500 proceeds to block 508, described below. On the other hand, if the worker manager 140 determines that there is no such instance, the routine 500 proceeds to block 506.

At block 506, the worker manager 140 obtains a new instance from the warming pool 130A or from the warming pool manager 130.

At block 508, the worker manager 140 or the security manager 150 creates a first container on the obtained instance. The first container may be created and configured to execute a first portion of the program code using the trusted credentials associated with the request to execute the program code.

At block 510, the worker manager 140 or the security manager 150 creates a second container on the obtained instance. The second container may be created and configured to execute a second portion of the program code without using or involving the trusted credentials associated with the request to execute the program code. The second container may be configured to communication with the first container, for example via an inter-process communication ("IPC") protocol. The IPC protocol may include, for example, one of a socket pair, a pipe, a named pipe, a shared memory on the virtual machine instance, or a message queue. For example, the first container may be configured to send inter-process communications to the second container to request processing of the second portion of the program code on-demand. Although the example described with reference to the routine 500 involves two portions of the program code, any number of portions may be determined and a corresponding number of respective containers may be created to execute respective portions using respective credentials having different levels of trust. In some cases the first and the second containers may be configured in a master-slave relationship, such that the second container containing the second portion of less trusted program code may only be executed responsive to requests received from the first container. In some cases the first and second containers may be configured in a sibling relationship, each executing its respective program code independently of the other but so as to separate processes involving trusted credentials from processes involving less trusted code.

At block 512, the worker manager 140 causes the request to be processed using the first and second containers. In some cases, the first and second portions of the program code may be executed simultaneously and in parallel. In some cases, the second portion of the program code may only be executed in response to requests received by the second container from the first container.

While the routine 500 of FIG. 5 has been described above with reference to blocks 502-512, the embodiments described herein are not limited as such, and one or more blocks may be omitted, modified, or switched without departing from the spirit of the present disclosure.

Figure 6:
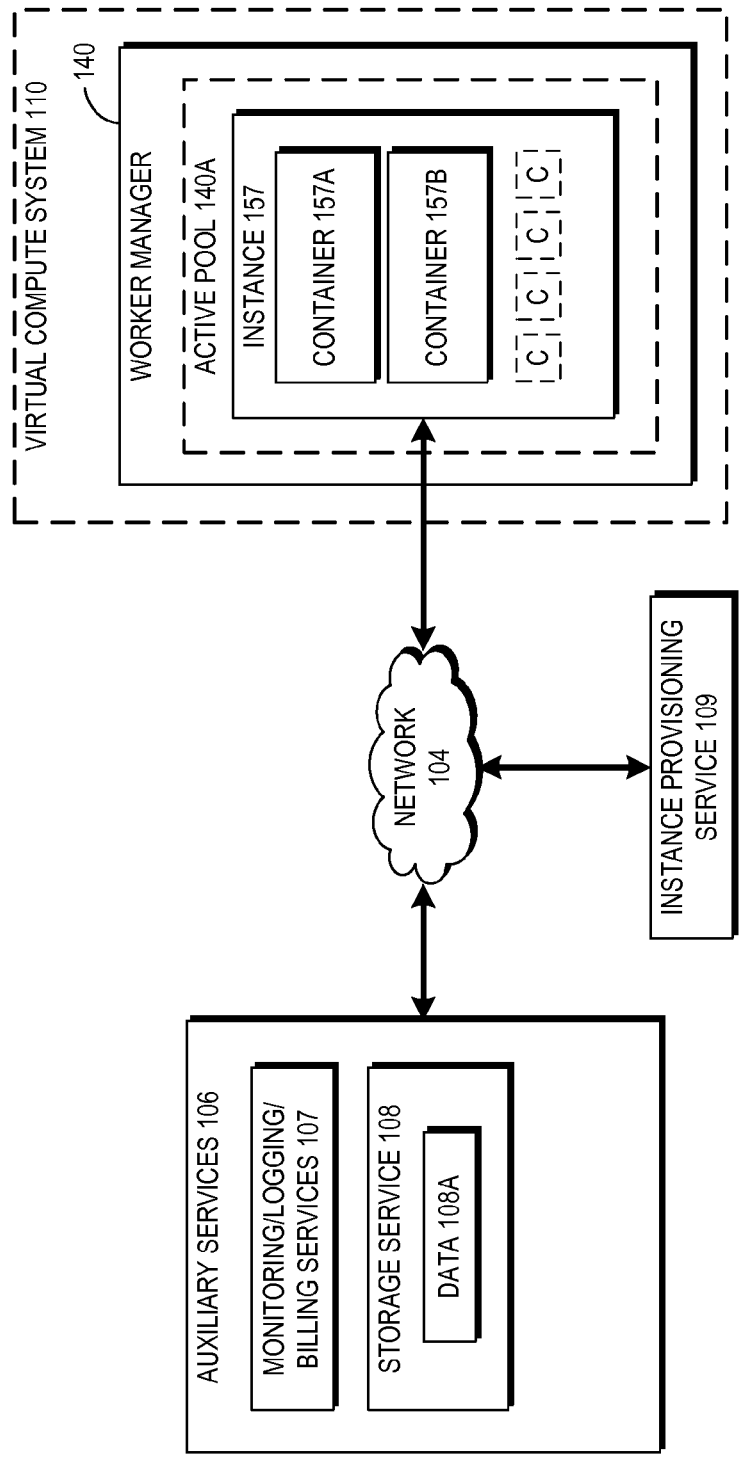
FIG. 6 is a block diagram depicting an illustrative environment for a security routine which involves interfacing with an auxiliary service, as implemented by a virtual compute system, such as the virtual compute system of FIG. 1.

With reference to FIG. 6, a security mechanism which involves a virtual machine instance interfacing with an auxiliary service according to an example embodiment, such as the embodiment of FIG. 1, is illustrated. In the example of FIG. 6, the instance 157 is configured to process incoming code execution requests associated with a particular program code. The instance 157 is shown communicating with one or more auxiliary services 106 and the instance provisioning service 109 over the network 104. For example, the instance 157 may initially communicate with the instance provisioning service 109 during the provisioning and configuration state, and subsequently communicate directly with an auxiliary service 106. The security manager 150 may be configured to manage and secure this connection to prevent interference from nefarious third parties.

Figure 7:
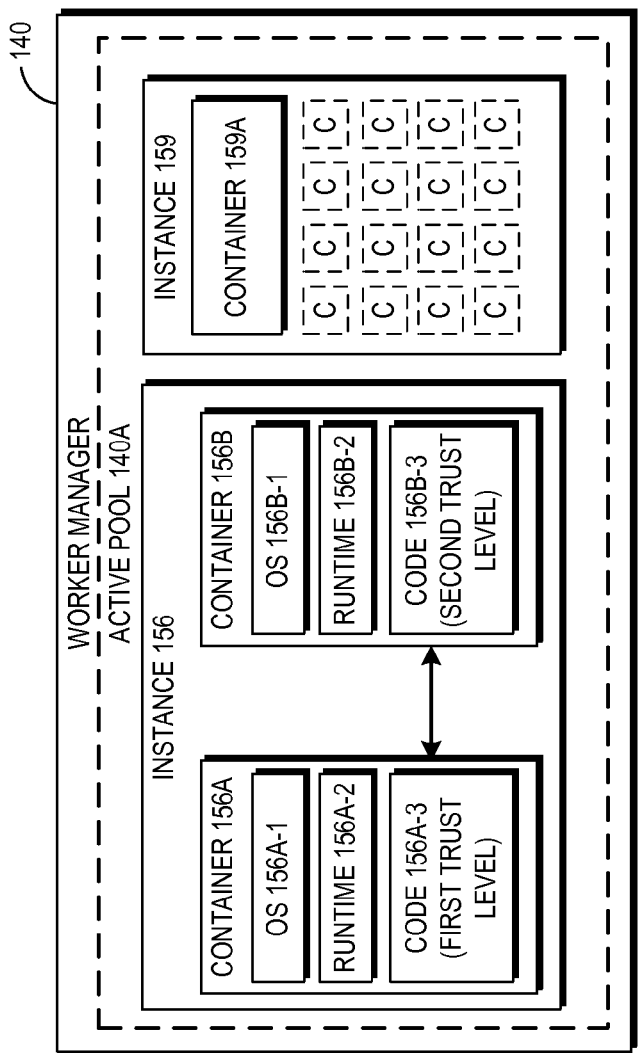
FIG. 7 is a block diagram depicting an illustrative environment for a security routine which involves executing program code in portions associated with different levels of trust, as implemented by a virtual compute system, such as the virtual compute system of FIG. 1.

With reference to FIG. 7, a security mechanism which involves executing program code in portions associated with different levels of trust according to an example embodiment, such as the embodiment of FIG. 1, is illustrated. In FIG. 7, instance 156 is configured to process incoming code execution requests associated with a particular program code. Instance 156 includes a container 156A, which has been loaded with a first portion of the program code having a first trust level; and a container 156B which has been loaded with a second portion of the program code having a second trust level. Container 156A is shown as being in direct communication with container 156B. For example, container 156A may send a request to container 156B to execute the second portion of the code without the need to pass any trusted or secure credential information to container 156B. Container 156B may process the request received from container 156A and optionally provide a response upon its completion.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing low-latency computational capacity from a virtual compute fleet, the system comprising:
   an electronic data store configured to store at least a program code of a user; and
   a virtual compute system comprising a plurality of virtual machine instances usable to execute one or more program codes thereon on a per-request basis, the virtual compute system comprising one or more hardware computing devices configured to execute specific computer-executable instructions, the virtual compute system in communication with the electronic data store and configured to at least:
   maintain a first subset of the plurality of virtual machine instances in a warming pool comprising virtual machine instances to be assigned to a user and having one or more software components loaded thereon and a second subset of the plurality of virtual machine instances in an active pool comprising virtual machine instances assigned to one or more users;
   receive a request to execute a program code associated with a user on the virtual compute system, the request including information usable to identify the program code and the user associated with the program code, wherein the program code is associated with configuration data indicating at least a first portion of the program code to be executed with a trusted credential and a second portion of the program code to be executed without the trusted credential;

select from the warming pool or the active pool a virtual machine instance to be used to execute the program code;
create a first container in the selected virtual machine instance to execute the first portion of the program code with the trusted credential;
create a second container in the selected virtual machine instance to execute the second portion of the program code without the trusted credential such that both of the first container and the second container are created in the selected virtual machine instance, wherein the second container is configured to communicate with the first container;
cause the first portion of the program code associated with the user to be loaded from the electronic data store onto the first container in the selected virtual machine instance and executed in the first container with the trusted credential; and
cause the second portion of the program code associated with the user to be loaded from the electronic data store onto the second container in the selected virtual machine instance and executed in the second container without the trusted credential.

2. The system of claim 1, wherein the virtual compute system is further configured to cause the second portion of the program code to be executed in response to a request received from the first container.

3. The system of claim 1, wherein the second container is configured to communicate with the first container by an inter-process communication channel.

4. A computer-implemented method comprising:
as implemented by one or more computing devices configured with specific executable instructions,
receiving a request to execute a program code on a virtual compute system configured to execute program codes on a per-request basis, the request including information usable to identify the program code, wherein the virtual compute system comprising a plurality of virtual machine instances usable to execute one or more program codes thereon;
determining, based on the received request, a first portion of the program code to be executed at a first level of trust and a second portion of the program code to be executed at a second level of trust different from the first level of trust;
selecting, from the plurality of virtual machine instances maintained on the virtual compute system, a virtual machine instance to be used to execute the program code;
creating a first container in the selected virtual machine instance to execute the first portion of the program code at the first level of trust;
creating a second container in the selected virtual machine instance to execute the second portion of the program code in response to a request from the first container at the second level of trust such that both of the first container and the second container are created in the selected virtual machine instance;
configuring the first container to communicate with the second container to execute the second portion of the program code at the second level of trust;
causing the first portion of the program code to be loaded and executed in the first container in the selected virtual machine instance at the first level of trust; and
causing the second portion of the program code to be loaded and executed in the second container in the selected virtual machine instance in response to the request from the first container at the second level of trust.

5. The computer-implemented method of claim 4, wherein the first container is configured to communicate with the second container using an inter-process communication channel.

6. The computer-implemented method of claim 5, wherein the inter-process communication channel is one of a socket pair, a pipe, a named pipe, a shared memory on the virtual machine instance, or a message queue.

7. The computer-implemented method of claim 4, wherein the first level of trust utilizes a trusted credential provided with the request to execute the program code on the virtual compute system.

8. The computer-implemented method of claim 7, wherein the trusted credential is a login credential of a user associated with the program code, wherein the login credential is usable to access an auxiliary service on behalf of the user.

9. Non-transitory physical computer storage storing computer executable instructions that, when executed by one or more computing devices, configure the one or more computing devices to:
receive a request to execute a program code on a virtual compute system configured to execute program codes on a per-request basis, the request including information usable to identify the program code, wherein the virtual compute system comprising a plurality of virtual machine instances usable to execute one or more program codes thereon;
determine, based on the received request, a first portion of the program code to be executed with a trusted credential, wherein the first portion of the program code is configured to invoke a second portion of the program code to be executed without the trusted credential;
select, from the plurality of virtual machine instances maintained on the virtual compute system, a virtual machine instance to be used to execute the program code;
create a first container in the selected virtual machine instance to execute the first portion of the program code with the trusted credential;
create a second container in the selected virtual machine instance to execute the second portion of the program code in response to a request from the first container without the trusted credential such that both of the first container and the second container are created in the selected virtual machine instance;
configure the first container to communicate with the second container to execute the second portion of the program code without the trusted credential;
cause the first portion of the program code to be loaded and executed in the first container in the selected virtual machine instance with the trusted credential; and
cause the second portion of the program code to be loaded and executed in the second container in the selected virtual machine instance in response to the request from the first container without the trusted credential.

10. The non-transitory physical computer storage of claim 9, wherein the first container is configured to communicate with the second container using an inter-process communication channel.

11. The non-transitory physical computer storage of claim 10, wherein the inter-process communication channel is one of a socket pair, a pipe, a named pipe, a shared memory on the virtual machine instance, or a message queue.

12. The non-transitory physical computer storage of claim 9, wherein the trusted credential is provided with the request to execute the program code on the virtual compute system.

13. The non-transitory physical computer storage of claim 12, wherein the trusted credential is a login credential of a user associated with the program code, and wherein the login credential is usable to access an auxiliary service on behalf of the user.

14. A system, comprising:
a virtual compute system comprising a plurality of virtual machine instances usable to execute one or more program codes thereon on a per-request basis, the virtual compute system comprising one or more hardware computing devices configured to execute specific computer-executable instructions and configured to at least:
receive a request to execute a program code on the virtual compute system, the request including information usable to identify the program code;
determine, based on the received request, a first portion of the program code to be executed at a first level of trust and a second portion of the program code to be executed at a second level of trust different from the first level of trust;
select, from the plurality of virtual machine instances maintained on the virtual compute system, a virtual machine instance to be used to execute the program code;
create a first container in the selected virtual machine instance to execute the first portion of the program code at the first level of trust;
create a second container in the selected virtual machine instance to execute the second portion of the program code in response to a request from the first container at the second level of trust such that both of the first container and the second container are created in the selected virtual machine instance;
configure the first container to communicate with the second container to execute the second portion of the program code at the second level of trust;
cause the first portion of the program code to be loaded and executed in the first container in the selected virtual machine instance at the first level of trust; and
cause the second portion of the program code to be loaded and executed in the second container in the selected virtual machine instance in response to the request from the first container at the second level of trust.

15. The system of claim 14, wherein the virtual compute system is further configured to cause the first portion of the program code to be executed in response to a request from the second container.

16. The system of claim 14, wherein the first container is configured to communicate with the second container using an inter-process communication channel.

17. The system of claim 16, wherein the inter-process communication channel is one of a socket pair, a pipe, a named pipe, or a message queue.

18. The system of claim 14, wherein the second container is configured to only respond to requests from the first container to execute the second portion of the program code.

19. The system of claim 14, wherein the first level of trust grants access to a resource and the second level of trust denies access to the resource.

20. The system of claim 14, wherein the first level of trust utilizes a trusted credential provided with the request to execute the program code on the virtual compute system.

21. The system of claim 20, wherein the trusted credential is a login credential of a user associated with the program code, and wherein the login credential is usable to access an auxiliary service on behalf of the user.

22. The system of claim 14, wherein the first level of trust comprises a first set of security parameters, and wherein the second level of trust comprises a second set of security parameters that is a subset of the first set of security parameters.

23. The system of claim 14, wherein the virtual compute system is further configured to:
maintain a first subset of the plurality of virtual machine instances in a warming pool comprising virtual machine instances to be assigned to a user and a second subset of the plurality of virtual machine instances in an active pool comprising preconfigured virtual machine instances assigned to one or more respective users;
determine whether the active pool contains a configured container that has the program code loaded thereon, and, if so determined, select the virtual machine instance that contains the configured container to be used to execute the program code associated with a first user;
in response to determining that the active pool does not contain the configured container that has the program code loaded thereon, determine whether the active pool contains any virtual machine instance that has the program code stored thereon and, if so determined, select the virtual machine instance that has the program code stored thereon to be used to execute the program code associated with the first user;
in response to determining that the active pool does not contain any virtual machine instance that has the program code stored thereon, determine whether the active pool contains any virtual machine instance that is assigned to the first user and has available capacity to process the request, and, if so determined, select from the active pool the virtual machine instance that is assigned to the first user to be used to execute the program code associated with the first user; and
in response to determining that the active pool does not contain any virtual machine instance that is assigned to the first user and has available capacity to process the request, acquire the virtual machine instance from the warming pool to be used to execute the program code associated with the first user.

* * * * *